Patented June 10, 1930

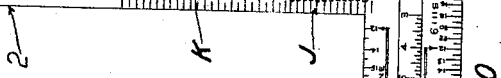
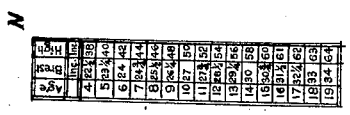
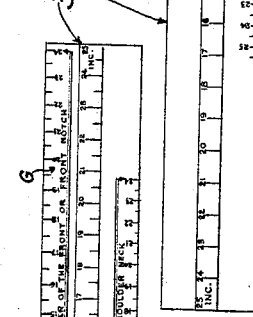
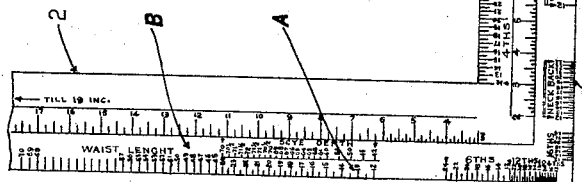

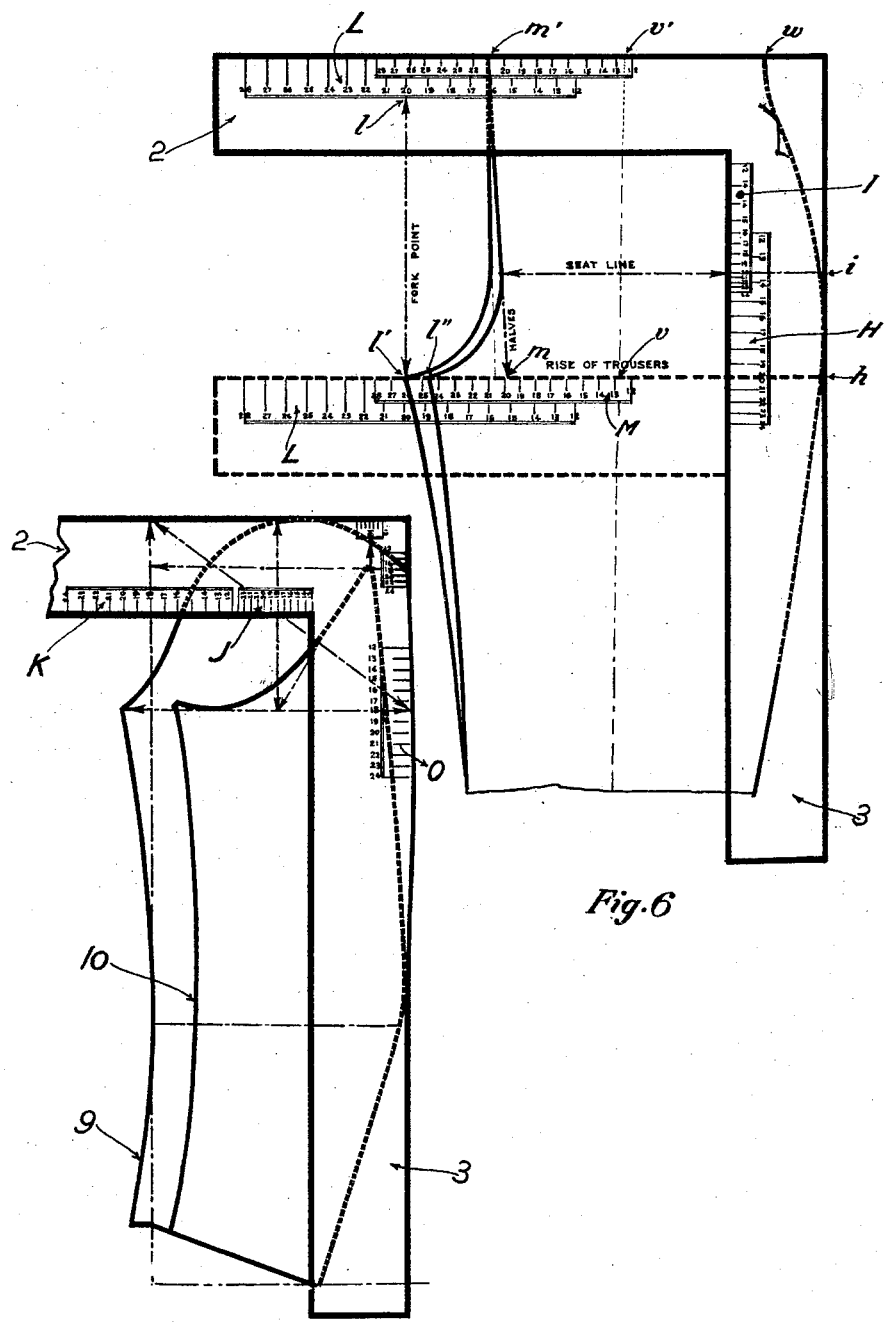

1,763,091

UNITED STATES PATENT OFFICE

ROSARIO CANGEMI, OF BOSTON, MASSACHUSETTS

TAILOR'S SQUARE

Application filed December 18, 1926. Serial No. 155,632.

This invention relates to measuring devices designed to be used by tailors.

When a tailor measures a man or boy for a suit of clothes he must, according to the usual practice, take a great number of measurements on the customer. When he comes to lay out his pattern or to cut his cloth, he must then, in order to fix the important points of the design, make fairly elaborate calculations based on the measurements which he has taken. The making of these calculations requires times, there is always a possibility of error, and if such an error is made and the cloth cut according to the erroneous calculations, valuable material is wasted.

The present invention aims to devise a measure, preferably in the form of a square, which will reduce the labor involved both in taking the original measurements for the average individual, and more especially to eliminate the necessity for the elaborate calculations heretofore required, and which will also reduce the time and labor involved in laying out the pattern or marking the goods for cutting.

The nature of the invention will be readily understood from the following description when read in connection with the accompanying drawings, and the novel features will be particularly pointed out in the appended claims.

In the drawings,

Figure 1 is a plan view showing one side of a square embodying this invention;

Fig. 2 is a similar view of the opposite side of the square, a small part of the square being broken away;

Fig. 3 is a plan view of a chart which may be applied to the square and is useful in making boy's clothing;

Figs. 5 and 6 are similar views showing how the square is used in laying out patterns for sleeves and trousers, respectively.

Figure 4:
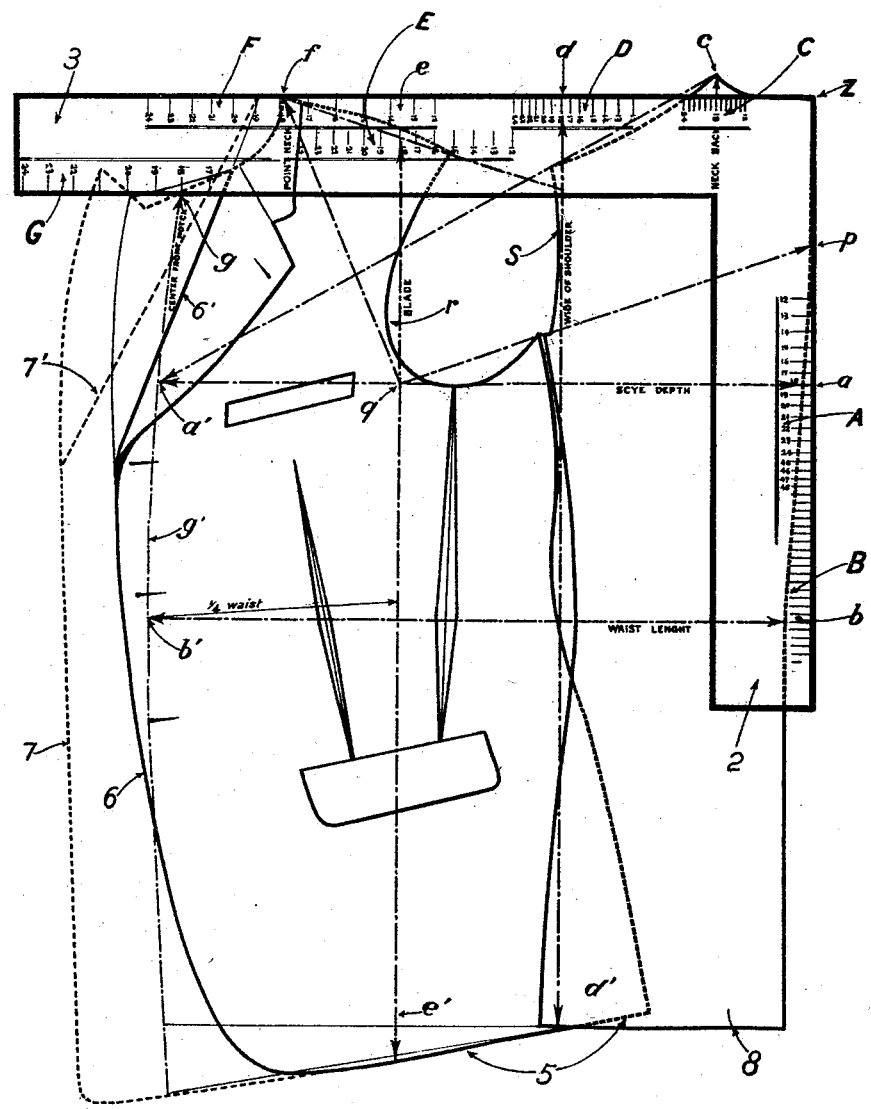
Fig. 4 is a diagrammatic view illustrating the method of using the square in laying out a pattern for a coat.

Referring first to Fig. 1, it will be observed that the arm 2 of the square bears a scale A for the scye depth and another scale B for the waist length. Both of these scales are graduated in terms of height, the height being given in inches. These graduations may be calculated in the usual manner employed by tailors, or they may be determined emperically. The other arm 3 of the square has on its outer margin a scale C for the neck back, another scale D for the width of the shoulder, a scale E for the blade, and a scale F for the point of the shoulder neck, the scale E being set inwardly away from the edge of the square. These scales, like the scales A and B, take their measurements from the outer corner of the square, and they are all graduated in designations of half of the chest measure, the exact measurements for the different scales being determined either emperically or by calculation.

It will be understood that the scale C determines the width or distance from the seam in the center of the back of the coat to the seam on the shoulder, the scale D determines the width of the back at the shoulder, the scale E is useful in indicating the point for the blade measurement, or the front arm hole, and the scale F is used in determining the point of the neck at the shoulder.

Along the inner edge of the arm 3 is a scale G also graduated in terms of half the chest measure, and designed for use in locating the center of the front of the coat, or the center of the front notch of the coat. This side of the square may also be graduated in inches, as is common in such calculations, and with fractional scales such as halves, fourths, sixths, eighths, twelfths and sixteenths, these graduations being common to tailors' measures.

It will be observed that all of the scales necessary to determine directly the more important points in laying out a coat pattern are on the side of the square shown in Fig. 1, which we may, for convenience, call the front side. The opposite or back side of the square, shown in Fig. 2, bears two scales H and I which are located on the inner margin of the arm 3, the scale H being for the rise of the trousers and I for the seat line. These scales are graduated in terms of half the girth at the seat line. The scale H is used in determining the location of the waist line above the fork point, and the scale I in fixing the location of the seat line. On the inner side of the arm 2 are scales J and K for half sleeves and sleeves, respectively. The outer margin of the arm 2 bears a scale L graduated in terms of half the seat measure, and particularly useful in determining the location of the fork point of the trousers.

This side of the square also bears inch scales, fractional scales, and a sleeve scale O. It will be observed that all the scales relating to the trousers and sleeves are located on this side of the square.

If desired, a chart N, Fig. 3, may also be applied to the square at any convenient point to designate the standard measures of height, age and chest ordinarily used in making boy's clothing.

The method of using the square will be evident to tailors, particularly with the aid of a very brief description. Fig. 4 illustrates the method of determining the important points necessary to lay out a pattern for a coat. The square is placed on the paper or cloth, as desired, with its long arm 3 located horizontally and that side uppermost which bears the scales relating to the points on the coat. A line then is drawn horizontally along the upper edge of the square and another line vertically along the outer edge of the arm 2 of the square. Assuming that the chest measurement is 36, and bearing in mind the fact that the scales on the arm 3 are graduated in half of the chest measure, the various points will be found directly opposite the number 18 on each scale. The point of the neck back $c$ is located opposite the number 18 on the scale C and up about three-quarters of an inch from the edge of said scale. The point $d$ for the wide of the shoulder, the point $e$ for the blade, and the point $f$ for the neck at the shoulder are located, respectively, opposite the numbers 18 on the scales D, E and F. Also, the point $g$ for the center of the front notch is found opposite the number 18 on the scale G. Leaving the square in this position, the points for the waist length and scye depth may now be located. The scye depth scale A is graduated both in terms of half the chest measure and also in terms of height, and the point $a$ is located opposite the chest measure designation 18. It will be observed that the height designation opposite the number 18 is 66, or five feet, six inches. The waist point $b$ may now be found opposite the height designation 66 on the scale B. These points having been determined, horizontal lines $a$—$a'$ and $b$—$b'$ are now drawn from the points $a$ and $b$, respectively, and vertical lines $d$—$d'$ and $e$—$e'$ are drawn from the points $d$ and $e$, respectively. One-half of the chest measure, plus a suitable allowance for seams, is now measured off on the breast line $a$—$a'$ starting from the back seam and thus fixing the point $a'$. This point being fixed the center line $g$—$g'$ of the coat may now be drawn in. From the point $a'$ a diagonal line $a'$—$c$ is drawn. One-half the distance between the point $a$ and the corner $z$ of the square fixes the point $p$, and a diagonal line $p$—$q$ is drawn between the point $p$ and the point $q$ at the intersection of the scye depth line with the blade line $e$—$e'$. These lines being drawn, it is now a simple matter to draw in the curved lines $r$ and $s$ which form the outline for the arm hole. The remainder of the outline for the front pattern of the coat may also be traced in with the aid of the points now fixed, and this pattern is shown at 5 in Fig. 4. If a double breasted coat pattern is being made, the front edge will follow approximately the dotted line 7 instead of the full line 6 which designates the edge of the single breasted coat. The crease lines for the two patterns are shown respectively at 6' and 7'.

With the aid of the same points which have now been determined, the pattern 8 for half the back may be traced in, the points $a$, $b$ and $c$ and the shoulder line $s$ all being used in determining the shape of this pattern, as well as the points of intersection of the shoulder line $d$—$d'$ with the scye depth and waist length lines.

The method of laying out the top sleeve 9 and under sleeve 10 will be obvious to those skilled in this art from an inspection of Fig. 5. In this operation the sleeve scales O and K and the half sleeve scale J, together with the fractional scales, are all useful.

In laying out the trousers pattern, the square is placed on the paper or the goods, as desired, in the manner shown in Fig. 6. Assuming that the girth on approximately the seat line is 40 inches, the points $i$ and $h$ for the seat line and the line from which to measure the rise of the trousers, and on which the fork points are located, are found respectively opposite the numbers 20 on the scales I and H, these numbers 20 being selected because they are half of the seat girth. The location of the fork point $l'$ for one trouser's leg (usually the left) is found on the scale L opposite the number 20. The fork point $l''$ for the front of the opposite leg is about three-quarters of an inch toward the right, Fig. 6, of the point $l'$, as will be readily understood by tailors. The distance between the points $l''$ and $h$ is now divided, giving the point $v$ which fixes the location of the center line or crease line $v$—$v'$. By laying off one-quarter of the waist measure at the left of the point $v'$ and another quarter at the right of said point, the points $m'$ and $w$ are obtained on the waist line.

The point $m$ is found opposite the number 20 on the scale M and, with the aid of these points, the fork lines $l'—m'$ and $l''—m'$ may now be drawn in.

It will be observed that the most important points which must be located in laying out the patterns for the garments are obtained directly from the square, while it remains in one position, when certain fundamental measurements of the customer are known, such, for example, as his height, and chest measure, the waist and seat measure for the trousers, and the measure for the length of the leg. Since the square gives these points directly without the necessity for making computations, the liability of making errors is greatly reduced, and the time required in laying out and drawing a pattern is materially shortened. Liability of making errors is further reduced by the fact that the points for each garment are determined while the square remains in a single position on the pattern or cloth. In tracing the pattern the skill, judgment and experience of the tailor is, of course, relied upon just as it is in laying out a pattern according to prior methods, but the labor involved in fixing many of the points necessary to draw the pattern is reduced very materially.

The scales have, of course, been designed with reference to the normal figure, but the square is, nevertheless, of material advantage also in laying out patterns for customers whose figures do not conform to the usual standard, although it may be necessary in the first instance to take more measurements on the customer than is required for a customer whose build agrees approximately with the standard.

While I have herein shown and described the best embodiment of my invention that I have so far devised, and an arrangement of the scales on the square which I regard as best adapted to facilitate the work of the tailor, it will be understood that some other arrangement may be made while still retaining the essential features of the invention. The square as shown is graduated in inches or according to the English system, since that is the system most commonly used in this country, but it is obvious that the square could also be graduated according to the metric system. This would make no difference in the location of the points on the scales A to O, respectively, but the numbers would, of course, be changed. Also, the inch square in the center of each arm of the square would be replaced by a centimeter scale.

Having thus described my invention, what I desire to claim as new is:

1. A tailor's square having thereon separate and independent scales for locating directly the important points to be fixed in laying out the pattern for a coat, certain of said scales being graduated in terms of height and others in terms of chest measure, and the scales being so located with reference to each other on the square that all the important points for the coat can be located directly from the scales while the square remains in a single fixed position on the pattern.

2. A tailor's square having thereon separate and independent scales for locating directly the important points to be fixed in laying out the pattern for a coat, certain of said scales being graduated in terms of height and others in terms of chest measure, said scales being so located with reference to each other on one side of the square that all of the important points for laying out the pattern for a coat can be located directly from the scales while the square remains in a single fixed position on the pattern, and sleeve and trouser scales on the opposite sides of the square, the trouser scales being graduated in terms of girth and including separate scales for the rise of the trousers and the seat line.

3. A tailor's square having thereon separate and independent scales for locating directly the important points to be fixed in laying out the pattern for a coat, certain of said scales being graduated in terms of height and others in terms of chest measure, said scales being so located with reference to each other on one side of the square that all of the important points for laying out the pattern for a coat can be located directly from the scales while the square remains in a single fixed position on the pattern, and sleeve and trouser scales independent of each other on the opposite sides of the square and on both arms thereof, one arm bearing a scale for the rise of the trousers and the seat line and the other having a scale for the horizontal measure to determine the fork point, all of said trouser scales being graduated in terms of girth.

4. A tailor's square having thereon separate scales for the scye depth and waist length, both of said scales being graduated in terms of height and being located on the same arm of the square, and additional scales on another arm for the width of the shoulder, the point of the shoulder, the neck back, and the center of the front notch, respectively, said additional scales being independent of each other and graduated in terms of chest measure.

5. A tailor's square having on one arm thereof independent scales for the neck back, width of the shoulder, and point of the shoulder, respectively, all of said scales being graduated in terms of chest measure, additional scales for the scye depth and waist length on the other arm of said square, said additional scales being graduated in terms of height, all of said scales being on one side of the square, and sleeve and trousers scales on the opposite side of the square, all of said scales being independent of each other.

6. A tailor's square having on one arm thereof independent scales for the neck back, width of the shoulder, point of the shoulder blade and center of the front notch, respectively, all of said scales being graduated in terms of chest measure and located on the front side of the square, additional scales for scye depth and waist length located on the other arm of said square but on the same side thereof, said additional scales being graduated in terms of height, and sleeve and trouser scales located on both arms of said square on the opposite side thereof, the trouser scales being graduated in terms of body girth.

ROSARIO CANGEMI.